United States Patent [19]
Johnson

[11] Patent Number: 5,750,952
[45] Date of Patent: May 12, 1998

[54] WELDING GUN WITH ANTI-ROTATION CYLINDER AND INTERNAL PROXIMITY SWITCH

[75] Inventor: Bruce R. Johnson, Muskegon, Mich.

[73] Assignee: Weld Technology Industries, L.L.C., Muskegon, Mich.

[21] Appl. No.: 601,228

[22] Filed: Feb. 14, 1996

Related U.S. Application Data

[63] Continuation-in-part of Ser. No. 568,736, Dec. 5, 1995.

[51] Int. Cl.⁶ .......................... B23K 11/11; B23K 11/36; F15B 15/14
[52] U.S. Cl. .......................... 219/89; 92/165 PR
[58] Field of Search .................. 219/86.25, 89; 92/165 PR, 5 R

[56] References Cited

U.S. PATENT DOCUMENTS

| | | |
|---|---|---|
| 2,661,599 | 12/1953 | Folmer . |
| 3,521,024 | 7/1970 | Roach . |
| 4,352,971 | 10/1982 | Slade ...................... 219/86.61 |
| 4,572,057 | 2/1986 | Werwerka ............... 92/165 PR |
| 4,736,674 | 4/1988 | Stoll ............................ 92/5 R |
| 4,771,866 | 9/1988 | Heidemann et al. ......... 92/5 R |
| 4,861,959 | 8/1989 | Cecil .............................. 219/89 |
| 4,879,440 | 11/1989 | Lymburner ................... 92/5 R |

FOREIGN PATENT DOCUMENTS

| | | | |
|---|---|---|---|
| 044278 | 1/1982 | European Pat. Off. | 92/5 R |
| 2059592 | 6/1971 | Germany | 92/5 R |
| 2306630 | 9/1974 | Germany | 92/165 PR |
| 2434302 | 1/1976 | Germany | 92/165 PR |
| 2637290 | 2/1978 | Germany | 92/165 PR |
| 2937412 | 4/1981 | Germany | 92/165 PR |
| 53-11281 | 2/1978 | Japan | 92/165 PR |
| 1373912 | 2/1988 | U.S.S.R. | 92/5 R |

*Primary Examiner*—Teresa J. Walberg
*Assistant Examiner*—J. Pelham
*Attorney, Agent, or Firm*—Warner Norcross & Judd

[57] ABSTRACT

A welding gun that prevents rotation of the electrode, including a cylinder and a reciprocating piston assembly having a pair of pistons. In addition to the conventional connecting rod, the pistons are interconnected by an anti-rotation rod radially offset from the connecting rod. The anti-rotation rod extends through a partition fixed within the cylinder, thereby preventing the piston assembly from rotating within the cylinder. The welding gun also includes an internal proximity switch for detecting when the piston assembly is fully retracted.

17 Claims, 4 Drawing Sheets

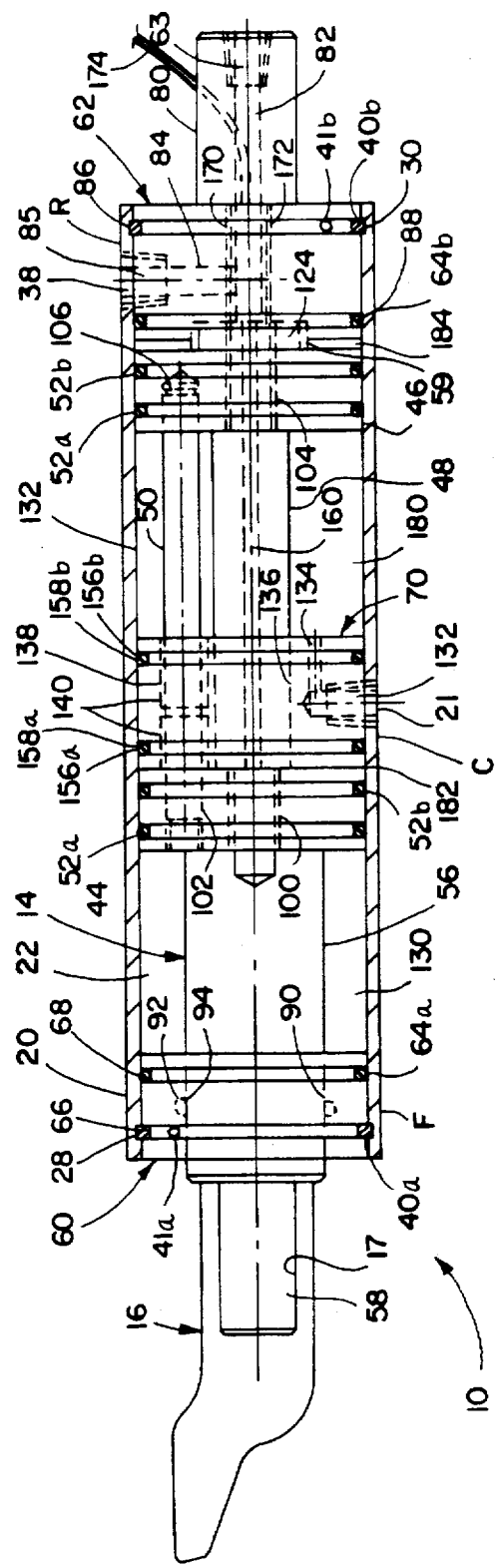
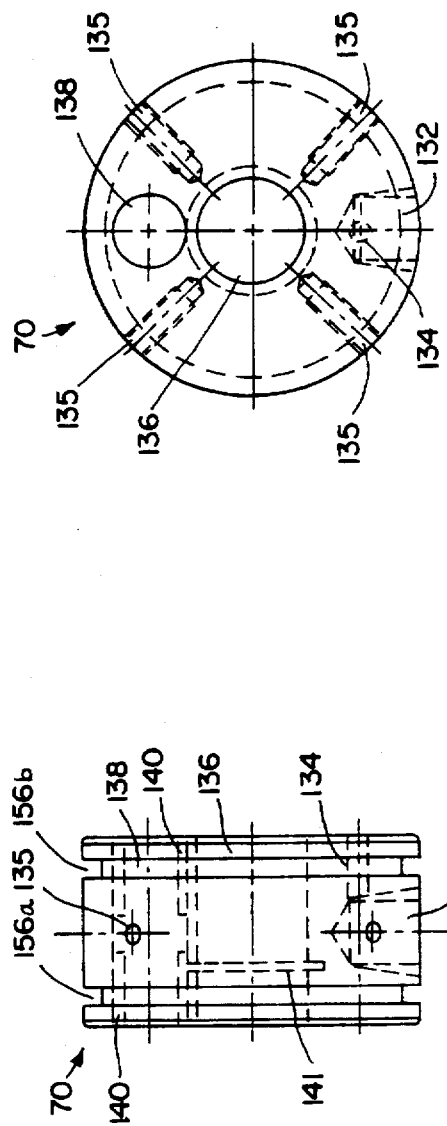
FIG. 3
FIG. 4
FIG. 5

WELDING GUN WITH ANTI-ROTATION CYLINDER AND INTERNAL PROXIMITY SWITCH

This application is a continuation-in-part of application Ser. No. 08/568,736, filed Dec. 5, 1995, (now pending).

BACKGROUND OF THE INVENTION

The present invention relates to actuating cylinders, and more particularly to actuating cylinders for automated welding guns.

In resistance welding, a high electrical current is passed through two abutting work pieces to melt and fuse the work pieces together. The current is supplied by engaging two welding tips or electrodes on opposite sides of the work pieces to be welded. Welding guns have been created to automatically move either or both of the welding electrodes into engagement with the work pieces. In a welding cycle, the work pieces are positioned between the electrodes; the electrodes are closed on the work pieces; the current is passed through the work pieces to weld them together; the electrodes are opened; and the welded unit is removed.

As noted, the basic function of a welding gun is to move either or both welding tips or electrodes toward and away from the work piece. The motive force is provided by a hydraulic or pneumatic cylinder that extends and retracts a piston assembly to move either or both electrodes. However, the piston assembly is free to rotate within the cylinder, causing rotation of the welding tip carried by the assembly. Such rotation may result in a weld that is misplaced or of undesirable quality. As a result, a number of techniques have been developed in an attempt to prevent rotation of the piston assembly.

A first technique includes a plastic insert in the front of the cylinder and a spline extending along the piston assembly. The insert includes a groove that interfits with the spline to prevent rotation of the assembly and therefore to prevent rotation of the electrode. The insert also seals the cylinder. Experience has revealed that the inserts do not have the desired useful life to withstand the wear of the reciprocating welding tip, and that the inserts do not provide the desired sealing of the cylinder.

A second technique includes an external guide structure interconnecting the cylinder and piston/rod assembly to prevent the welding tip from rotating. An example of this construction is shown in U.S. Pat. No. 4,352,971 issued to Slade and entitled "Self-Equalizing Welding Structure." The external guide structure significantly increases the size, complexity, cost, and servicing of the cylinder and is therefore unacceptable in many applications.

A third technique includes a non-circular piston rod and a mating bushing. An example of this construction is shown in U.S. Pat. No. 2,661,599 issued to Folmer and entitled "Pneumatically Operated Welder Head Construction." The non-circular cross section prevents relative rotation of the piston rod within the bushing. However, relatively complicated machining is required to manufacture the non-circular piston and corresponding bushing. Accordingly, the construction is more expensive than desired.

In many applications, it is desirable to sense when the cylinder is in the retracted position. This information is useful in timing the various phases of the welding cycle. A number of techniques have been developed to meet this need. One such method includes an externally-mounted proximity switch that is actuated when the piston assembly is fully retracted. Typically, a mechanical switch is mounted to the front of the cylinder and an actuator is mounted to the piston assembly to physically actuate the switch when the piston assembly is retracted. The mechanical switch and actuator are sometimes replaced by conventional electronic or electromechanical switches. This technique requires costly installation of both the switch and the actuator. Further, it increases the profile of the cylinder and locates the switch where it can be affected by the environment.

A second technique for determining when the cylinder is retracted is to include sensing apparatus in the air line feeding the cylinder. The sensing apparatus functions by sensing the increase in line pressure when the cylinder stops moving. However, this technique is not reliable because the line pressure may increase when the piston assembly is not fully retracted, thereby producing a false signal. For example, it is possible for the welding tip to weld itself to the workpiece. In such cases, the line pressure would indicate that the cylinder was retracted even though it had not even moved from the fully extended position. A false signal may throw off the timing of the welding cycle causing extensive damage to the welding gun and workpiece.

SUMMARY OF THE INVENTION

The aforementioned problems are overcome by the present invention wherein rotation of the welding gun electrode is prevented by a second rod (i.e. the anti-rotation rod) within the cylinder. The anti-rotation rod is radially offset from the piston rod and extends through a guide hole in a fixed partition within the cylinder. Additionally, the cylinder is provided with an internal sensor to indicate when the cylinder is retracted.

The welding gun includes a pneumatic cylinder and a piston assembly carrying the welding electrode. A fixed partition is mounted within the cylinder. The piston assembly includes a pair of pistons located on opposite sides of the partition. A conventional rod interconnects the pistons. An anti-rotation rod also interconnects the pistons and passes through a guide hole in the partition. The partition prevents rotation of the piston assembly and accordingly the welding electrode.

The present invention provides a simple and effective anti-rotation welding gun. The anti-rotation structure is entirely enclosed within the cylinder, is sealed from the environment, and does not increase the size of the welding gun. In addition, the present invention allows the use of conventional seals and avoids complex machining.

In a second aspect of the invention, the cylinder includes an internal sensor that detects when the piston assembly is fully retracted. The sensor includes a proximity switch extending into the cylinder so that it is actuated directly by the piston assembly when the piston assembly becomes fully retracted.

The internal sensor is a simple, effective, and reliable apparatus for sensing when the piston assembly is retracted. The internal sensor is actuated directly by the piston assembly thereby eliminating false readings when the welding tip becomes attached to the workpiece or the line pressure otherwise increases. Further, the internal sensor is mounted within the cylinder so it does not require external bracketing or increase the profile of the welding gun. Additionally, because the sensor is located within the cylinder, it is protected from the environment.

These and other objects, advantages, and features of the invention will be readily understood and appreciated by reference to the detailed description of the preferred embodiment and the drawings.

BRIEF DESCRIPTION OF THE DRAWINGS

FIG. 3 is a sectional view of the welding gun taken along line III—III of FIG. 1;

FIG. 4 is a side elevational view of the partition;

FIG. 5 is a front elevational view of the partition;

DETAILED DESCRIPTION OF THE PREFERRED EMBODIMENT

Figure 1:
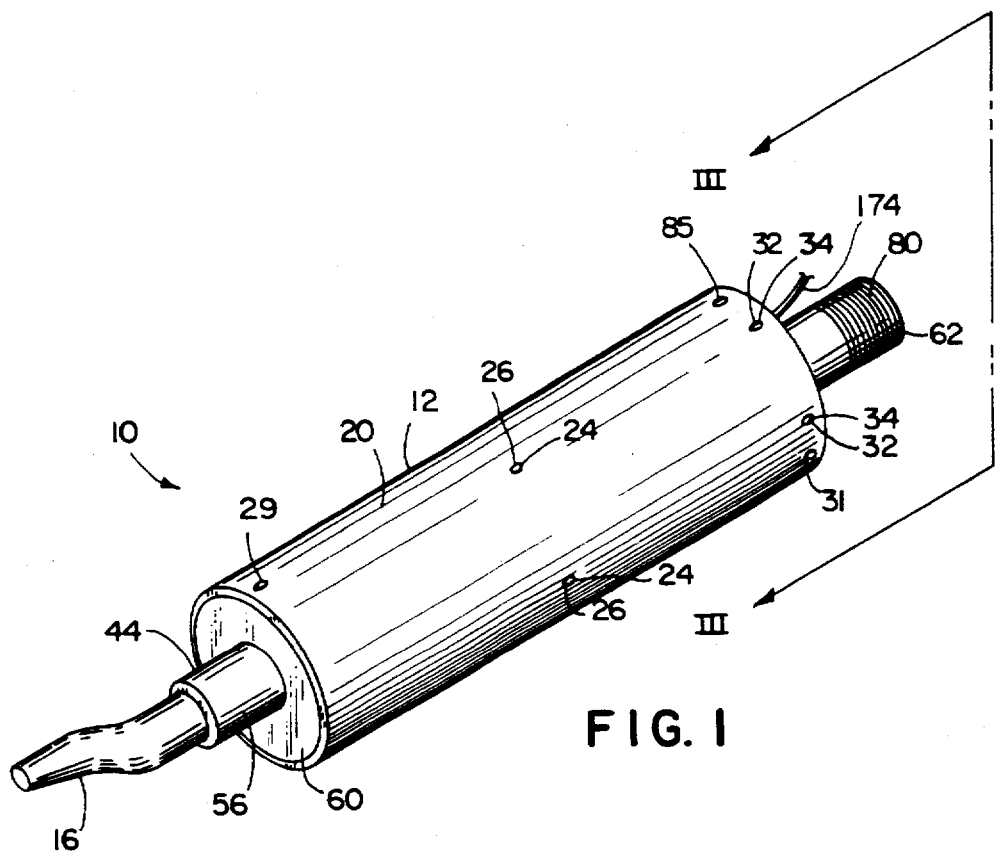
FIG. 1 is a perspective view of the welding gun.

An anti-rotation welding gun according to a preferred embodiment of the present invention is illustrated in FIG. 1, and generally designated 10. The present invention is disclosed in connection with an automated welding gun having a pneumatic cylinder and a split, double-piston assembly. However, the present invention is well suited for use in other applications where rotation of the piston is not desired, as well as with other types of cylinders, such as hydraulic cylinders and other multiple piston cylinders.

The welding gun 10 includes a pneumatic cylinder 12 having a reciprocating internal piston assembly 14. The pneumatic cylinder 12 is operated by a conventional automated control system (not shown). The control system provides air to the welding gun 10 in a well known manner to selectively extend and retract the piston assembly 14. A welding tip 16 is mounted to and reciprocates with the piston assembly 14. In use, the welding gun 10 is mounted at a work station upon a conventional support structure (not shown). To perform a weld, the cylinder 12 is extended to move the welding tip 16 toward the work piece (not shown). After the weld is formed the cylinder 12 is retracted to move the welding tip 16 away from the work piece. The process is repeated for additional welds.

Cylinder 12 includes a circumferential wall 20 defining a longitudinal internal bore 22 which seats the reciprocating piston assembly 14. A central portion C of the cylinder wall 20 defines a plurality of radially extending, countersunk screw holes 24 to receive screws 26 for securing internal partition 70 (described below) within the cylinder bore 22. Central portion C of the cylinder wall 20 also defines a radially extending air supply hole 21. A rear portion R of the cylinder wall 20 defines a plurality of radially extending screw holes 32 to receive screws 34 for securing closure 62 (described below) within the cylinder bore 22. Rear portion R of the cylinder wall 20 also defines a radially extending air supply hole 38. Additionally, annular recesses 28 and 30 are defined around the inside of cylinder wall 20 at opposite ends of the cylinder 12 to receive snap rings 40a and 40b for securing closures 60 and 62 within the cylinder bore 22. Conventional slots 29 and 31 penetrate the cylinder wall 20 in communication with each annular recess 28 and 30, respectively, to facilitate installation of snap rings 40a and 40b (See FIG. 2).

Opposite ends of the cylinder 12 are sealed by front and rear closures 60 and 62, respectively. As noted above, the closures 60 and 62 are retained within the cylinder bore 22 by snap rings 40a and 40b, respectively. Closures 60 and 62 are closely fitted within the cylinder bore 22 and include an O-ring seal 64a–b to provide a sealing engagement with the cylinder wall 20. Front closure 60 seals off the front F of the cylinder 12 and is penetrated by stem 56. The outside of the front closure 60 defines a pair of annular recesses 66 and 68 to receive snap ring 40a and O-ring seal 64a, respectively. Front closure 60 also defines a snap ring bore 41a within annual recess 66 to receive the retaining leg (not shown) of snap ring 40a. In addition, front closure 60 defines a concentric, longitudinal bore 90 for slidingly receiving stem 56 and an annular recess 92 within bore 90 to receive O-ring seal 94 which provides a sliding, sealing engagement with the stem 56.

Figure 2:
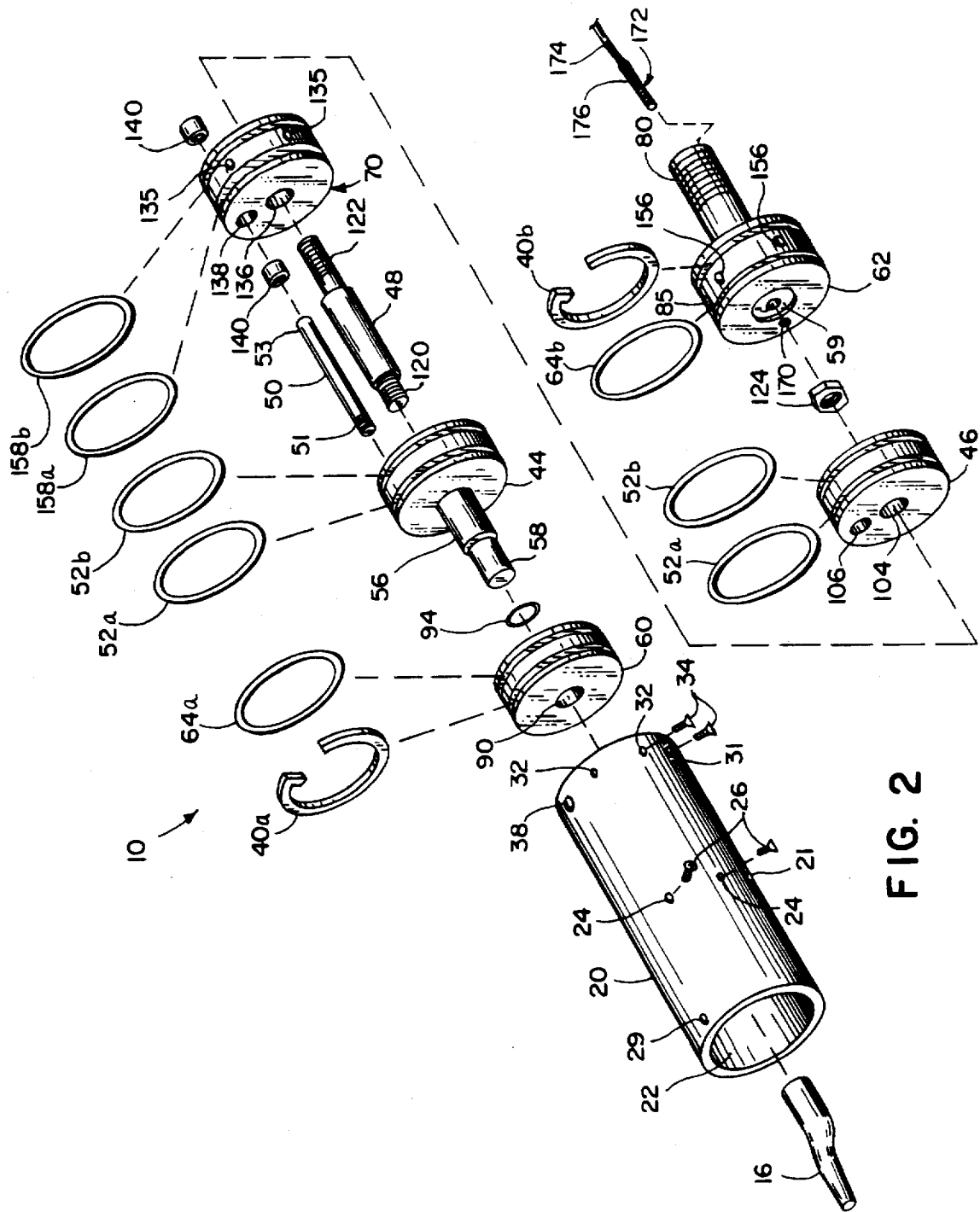
FIG. 2 is an exploded perspective view of the welding gun.

Rear closure 62 seals off the rear R of the cylinder and includes an integral, rearwardly extending, tail 80 that is threaded to engage a mounting bracket (not shown). The forward end of rear closure 62 defines counterbore 59 to receive nut 124. Like front closure 60, rear closure 62 defines a pair of annular recesses 86 and 88 which receive snap ring 40b and O-ring seal 64b, respectively. Rear closure 62 defines a snap ring bore 41b within annual recess 86 to receive the retaining leg (not shown) of snap ring 40b. Rear closure 62 further defines a plurality of radially extending, threaded screw bores 156 for receiving screws 34. Rear closure 62 also defines an inlet 63 and a concentric longitudinal, air passage 82 extending entirely through the closure 62. The inlet 63 is threaded to receive a conventional plug or air fitting (not shown). In addition, rear closure 62 defines a radial inlet 85 and a radial air passage 84 that extends into rear closure 62 in communication with passage 82. The radial inlet 85 is threaded to receive a conventional plug or air fitting (not shown). As shown in FIGS. 2 and 3, rear closure 62 further defines a longitudinal, threaded bore 170 for receiving proximity switch 172. The threaded bore 170 is radially spaced ninety degrees from radial inlet 85.

The cylinder bore 22 is divided into a front chamber 130 and a rear chamber 132 by partition 70. The partition 70 defines a plurality of radially extending, threaded screw bores 135 for receiving screws 26 (See FIG. 5). The screws 26 penetrate the cylinder wall 20 to secure the partition 70 in place within the cylinder bore 22. Partition 70 defines an air inlet 132 and an air passage 134 for allowing air to flow into and out of the rear chamber 132 (See FIG. 4). Air inlet 132 is threaded to receive a conventional air fitting (not shown). Partition 70 also defines a concentric piston rod guide hole 136 and an offset anti-rotation rod guide hole 138. Partition 70 defines an annular recess 141 inside of piston rod guide hole 136 to seat an O-ring seal 142 which provides a sliding, sealing engagement between partition 70 and piston rod 48. A pair of bushings 140 are fitted within anti-rotation rod guide hole 138 to provide sliding, sealing engagement between partition 70 and anti-rotation rod 50. Partition 70 further defines annular recesses 156a and 156b to seat O-ring seals 158a and 158b which provide a sealing engagement with cylinder wall 20.

Figure 6:
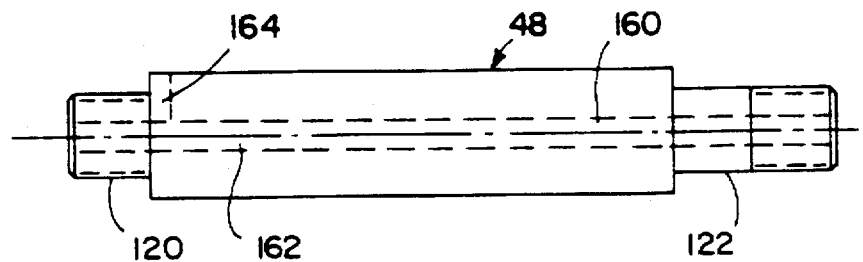
FIG. 6 is a side elevational view of the piston rod.
Figure 7:
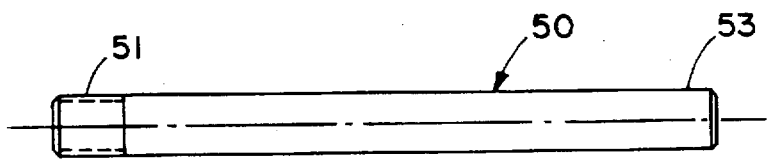
FIG. 7 is a side elevational view of the anti-rotation rod.

The piston assembly 14 reciprocates within cylinder bore 22 in response to the supply of air. The piston assembly 14 includes a first piston 44 located in front chamber 130 and a second piston 46 located in rear chamber 132. The two pistons 44 and 46 are interconnected by a piston rod 48 and an anti-rotation rod 50, which pass through guide holes 136 and 138 in partition 70. As perhaps best illustrated in FIG. 6, piston rod 48 is generally conventional and is adapted to maintain the pistons 44 and 46 in spaced relationship. Piston rod 48 includes threaded reduced diameter end portions 120 and 122. Piston 44 is threadedly secured directly to end portion 120 while piston 46 is fitted over end portion 122 and secured to the piston rod 48 by nut 124. Piston rod 48 defines an air passage 160 for establishing communication between chambers 130 and 132 through partition 70. Air passage 160 includes longitudinal passage 162 and intersecting radial passage 164. Anti-rotation rod 50 includes a threaded end 51 that is threadedly secured to piston 44 and a non-threaded end 53 that is fitted to piston 46 (See FIG. 7).

Figure 10:
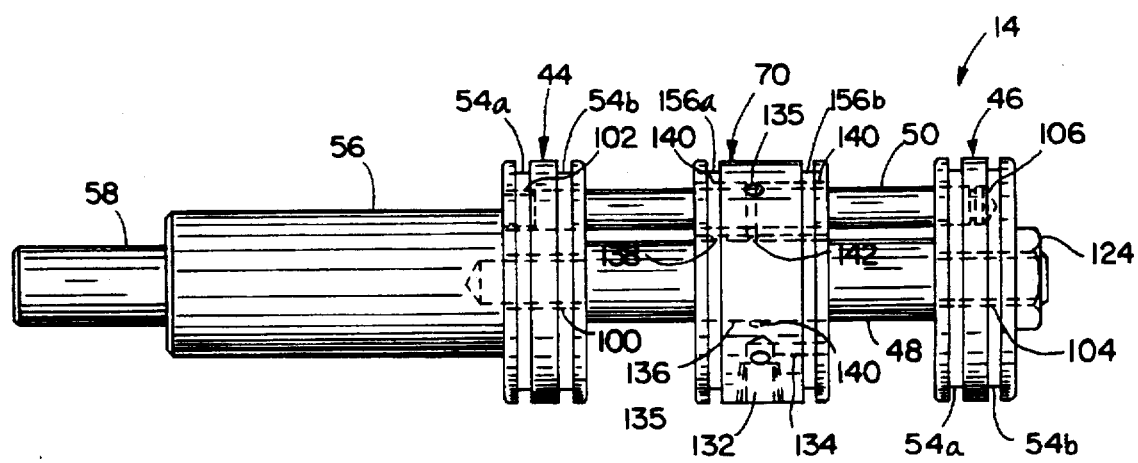
FIG. 10 is a side elevational view of the piston assembly and the partition.
Figure 8:
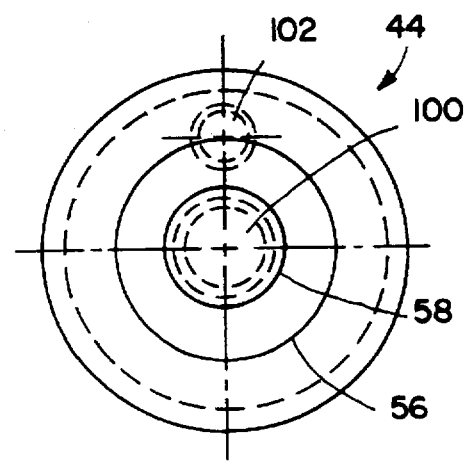
FIG. 8 is a front elevational view of the front piston.
Figure 9:
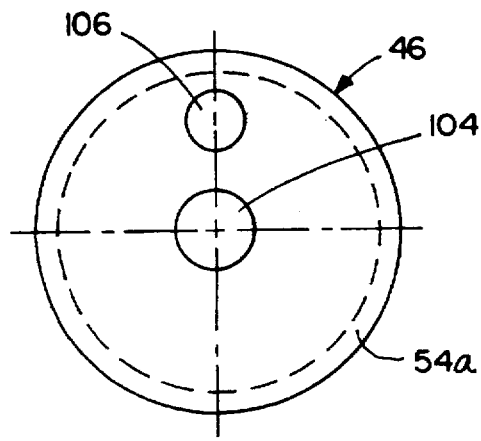
FIG. 9 is a front elevational view of the rear piston.

Each piston 44 and 46 closely fits within the cylinder bore 22 and includes O-ring seals 52a and 52b which provide sliding, sealing engagement with the cylinder wall 20. The O-ring seals 52a–b are seated in annular recesses 54a–b defined around the outside of each piston 44 and 46. Piston 44 includes an integral, forwardly extending stem 56 for supporting the welding tip 16 (See FIGS. 8 and 10). The stem 56 is generally cylindrical and includes a diameter that is significantly smaller than that of the piston 44. The stem 56 also includes a reduced diameter end portion 58 which carries the welding tip 16. Piston 44 defines a threaded, concentric bore 100 adapted to threadedly receive piston rod end portion 120. Piston 44 also defines a threaded, offset bore 102 extending parallel to and offset from bore 100 to threadedly receive anti-rotation rod end portion 51. Piston 46 defines a concentric, bore 104 extending entirely therethrough for receiving piston rod end portion 122, and an offset bore 106 extending parallel to and offset from bore 104 for receiving anti-rotation rod end portion 52 (See FIGS. 9 and 10).

Proximity switch 172 is fitted within threaded bore 170 to sense when the piston assembly is fully retracted. The proximity switch 172 is a conventional 5–30 volt proximity switch available from a variety of well-known suppliers. The proximity switch can be replaced by other conventional sensing devices. The proximity switch is generally cylinder and includes a threaded exterior wall 176 that mates with the threaded bore 170. Electrical leads 174 extend from the switch 172 to a conventional welding gun control system (not shown). The proximity switch 172 is actuated directly by the piston assembly 14. An epoxy (not visible) is applied around the proximity switch to seal it within bore 170. In the event that proximity switch 172 is not desired, threaded bore 170 can be eliminated.

The welding tip 16 is conventional and therefore will not be described in detail. Suffice it to say that welding tip 16 defines a bore 17 that is fitted over end portion 58.

Assembly and Operation

To assemble the welding gun 10, piston rod 48 and anti-rotation rod 50 are threadedly secured to piston 44 within bores 100 and 102, respectively. Piston 46 is not secured to the rods at this time.

Partition 70 is assembled by installing bushings 140 in anti-rotation rod guide hole 138, O-ring seal 142 within annular recess 141, and O-ring seals 158a–b in annular recesses 156a–b. Next, piston rod 48 and anti-rotation rod 50 are fitted through guide holes 136 and 138, respectively. Afterwards, piston 46 is fitted over piston rod end portion 122 with offset bore 106 fitted over the non-threaded end 53 of anti-rotation rod 50. Nut 124 is installed onto piston rod end portion 122 to secure piston 46 to the piston assembly 14. O-ring seals 52a–b are installed within recesses 54a–b in both pistons 44 and 46 (See FIGS. 8–10).

The piston assembly 14 and partition 70 are inserted into the cylinder bore 22. Partition 70 is secured in the center of the cylinder bore 22 by screws 26 extending through holes 24 into screw bores 134. Screws 26 prevent the partition 70 from rotating within the cylinder 12.

Next, front closure 60 and rear closure 62 are mounted within opposite ends F and R of the cylinder bore 22. Closure 60 is fitted with O-ring seal 64a and secured in the front of cylinder 12 by snap ring 40a, and closure 62 is fitted with O-ring seal 64b and secured in the rear of cylinder 12 by snap ring 40b and screws 34. Screws 34 prevent closure 62 from rotating with respect to the cylinder 12. Proximity switch 172 is threaded and epoxied into threaded bore 170 (See FIGS. 2 and 3). The epoxy (not shown) seals the switch 172 within the bore 170 to prevent the escape of air from the cylinder 12. Electrical leads 174 from the proximity switch 172 are connected to the welding gun control system (not shown) in a conventional manner. It may be necessary to slot or otherwise adapt the mounting apparatus (not shown) to accommodate electrical leads 174.

The welding gun 10 can be mounted in a conventional manner to an appropriate support structure (not shown) at the desired welding location. A mounting bracket (not shown) can be threadedly secured to tail 80 to facilitate mounting. The desired welding tip 16 is mounted to stem end portion 58.

The welding gun 10 is connected to conventional automated control system (not shown). A first air supply line (not shown) is connected to inlet 132 to supply the air that retracts the piston assembly 14. A second air supply line (not shown) is connected to either inlet 63 or inlet 85, as desired, to supply the air that extends the piston assembly. A conventional plug (not shown) is installed in whichever inlet 63 or 85 is not connected to an air supply line.

The welding process, including reciprocation of the piston assembly, is controlled by a conventional welding gun control system (not shown). In operation, piston assembly 14 and consequently welding tip 16 reciprocate in response to the supply of air. To retract the welding tip 16, air is supplied to inlet 132. From inlet 132, the air flows through passage 134 into subchamber 180. The continued supply of air to subchamber 180 results in the application of increasing pressure on piston 46. Simultaneously, air is permitted to escape from subchambers 182 and 184 through a conventional valve arrangement (not shown). When sufficient pressure is applied to piston 46, the piston assembly 14 is urged backward. When the piston assembly is fully retracted, it actuates proximity switch 172. The welding gun control system (not shown) monitors the proximity switch 172 to determine when the piston is fully retracted. This information can be used by the control system to time the various phases of the welding cycle. To extend the welding tip, air is supplied to either inlet 53 or inlet 85. From either inlet 53 or 85 the air flows through passage 82 into subchamber 184 and from subchamber 84 through air passage 160 into subchamber 182. The continued supply of air to subchambers 182 and 184 results in the application of increasing pressure on pistons 44 and 46. Simultaneously, air is permitted to escape from subchamber 180 through a conventional valve arrangement (not shown). When sufficient pressure is applied to pistons 44 and 46, the piston assembly 14 is extended.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A welding gun comprising:

a cylinder defining an internal bore having an axis;

a partition rigidly secured within said internal bore of said cylinder, said partition defining a piston rod guide hole aligned with said axis and an anti-rotation rod guide hole offset from said axis;

a piston assembly reciprocable within said internal bore of said cylinder, said piston assembly including a piston rod extending through said piston rod guide hole, said piston assembly further including first and second pistons secured to said piston rod on opposite sides of said partition, said pistons entirely contained within said internal bore;

a welding tip carried by said piston assembly; and an anti-rotation rod secured to and extending between said pistons through said anti-rotation guide hole, said anti-rotation rod entirely contained within said internal bore and adapted to reciprocate along with said piston assembly.

2. The welding gun of claim 1 further comprising an internal sensor for determining when said piston assembly is fully retracted, said sensor being actutated directly by said piston assembly.

3. An anti-rotation welding gun, comprising:

a cylinder defining an internal bore;

a partition fixedly secured within said bore, said partition defining first and second guide holes;

first and second pistons movably seated within said internal bore on opposite sides of said partition;

a welding tip secured to said first piston;

a first rod secured to and extending between said first and second pistons, said first rod extending through said first guide hole; and a second rod secured to and extending between said first and second pistons, said second rod extending through said second guide hole, said second rod adapted to move with said pistons and entirely contained within said internal bore throughout the entire range of motion of said pistons.

4. The welding gun of claim 3 further comprising a bushing seated within at least one of said first and second guide holes.

5. The welding gun of claim 4 wherein said first rod and said second rod are threadedly secured to said first piston.

6. The welding gun of claim 5 wherein said first rod is concentrically aligned with said first piston and said second rod is parallel to and offset from said first rod.

7. The welding gun of claim 6 further comprising an internal sensor for determining when said cylinder is fully retracted, said sensor being actutated directly by one of said pistons.

8. A cylinder, comprising:

a cylinder wall defining a cylinder bore;

a partition fixedly secured within said bore, said partition defining a piston rod guide hole and an anti-rotation rod guide holes;

first and second pistons slidably disposed within said cylinder bore on opposite sides of said partition;

a piston rod extending between said first and second pistons through said piston rod guide hole in said partition; and an anti-rotation rod extending between said first and second pistons through said anti-rotation rod guide hole in said partition, said anti-rotation rod carried by said pistons and entirely contained within said bore throughout the entire range of motion of said pistons.

9. The cylinder of claim 8 further comprising a bushing seated within at least one of said first and second guide holes.

10. The cylinder of claim 9 wherein said piston rod and said anti-rotation rod are threadedly secured to said first piston.

11. The cylinder of claim 10 wherein said piston rod is concentrically aligned with said first piston and said anti-rotation rod is parallel to and offset from said piston rod.

12. The cylinder of claim 12 further comprising an internal sensor for determining when said cylinder is fully retracted, said sensor being actutated directly by one of said pistons.

13. A cylinder, comprising:

a cylinder wall defining a cylinder bore;

a partition secured within said bore, said partition defining a piston guide hole and an anti-rotation guide hole;

a pair of pistons slidably disposed within said cylinder bore on opposite sides of said partition, said pistons having a common axis;

an anti-rotation rod extending between said pistons through said anti-rotation rod guide hole, said anti-rotation rod being offset from said axis of said pistons, said anti-rotation rod carried by said pistons and entirely contained within said cylinder bore throughout the entire range of motion of said pistons.

14. A welding gun comprising:

a cylinder defining an internal bore circular in cross section and having a longitudinal axis;

a pair of pistons reciprocable within said bore;

guide hole means within said cylinder bore for defining a guide hole radially offset from said axis, said guide hole means being nonrotatable with respect to said axis; and an anti-rotation rod extending between and carried by said pistons said anti-rotation rod extending through said guide hole means and being entirely contained within said cylinder bore throughout the entire range of motion of said pistons, said rod being parallel to and offset from said axis, whereby said anti-rotation rod prevents said piston from rotating within said cylinder bore.

15. A welding gun comprising:

a cylinder defining an internal bore;

a partition secured within said bore;

a piston assembly reciprocable within said internal bore of said cylinder, said piston assembly including a pair of pistons located on opposite sides of said partition and a piston rod extending between said pistons through said partition;

an anti-rotation rod extending between and carried by said pistons, said anti-rotation rod extending through said partition;

a welding tip carried by said piston assembly; and an internal sensor means for sensing when said piston assembly is fully retracted, said sensor means mounted internally within said cylinder and actuated directly by said piston assembly when said piston assembly becomes fully retracted.

16. The welding gun of claim 15 wherein said cylinder includes a rear closure, said sensor means being mounted within said rear closure.

17. The welding gun of claim 16 wherein said sensor means is a proximity switch, said proximity switch threadedly mounted within a bore extending through said rear closure.

* * * * *

UNITED STATES PATENT AND TRADEMARK OFFICE
CERTIFICATE OF CORRECTION

PATENT NO.   :   5,750,952
DATED        :   May 12, 1998
INVENTOR(S)  :   Johnson It is certified that error appears in the above-indentified patent and that said Letters Patent is hereby corrected as shown below:

Column 7, Claim 8, Line 54:
   delete "holes" and insert --hole--

Column 8, Claim 12, Line 7:
   "12" should be --11--

Signed and Sealed this

First Day of September, 1998

Attest:

BRUCE LEHMAN

*Attesting Officer*            Commissioner of Patents and Trademarks